US011275925B2

(12) United States Patent
Ghazaryan et al.

(10) Patent No.: US 11,275,925 B2
(45) Date of Patent: Mar. 15, 2022

(54) VIOLENCE DETECTION SYSTEM

(71) Applicant: SCYLLA TECHNOLOGIES INC., Wilmington, DE (US)

(72) Inventors: Ara Ghazaryan, Munich (DE); Albert Stepanyan, Munich (DE)

(73) Assignee: SCYLLA TECHNOLOGIES INC., Wilmington, DE (US)

( * ) Notice: Subject to any disclaimer, the term of this patent is extended or adjusted under 35 U.S.C. 154(b) by 174 days.

(21) Appl. No.: 16/385,510

(22) Filed: Apr. 16, 2019

(65) Prior Publication Data

US 2020/0334448 A1    Oct. 22, 2020

(51) Int. Cl.
*G06K 9/00* (2006.01)
*G06K 9/32* (2006.01)
*G06T 7/11* (2017.01)

(52) U.S. Cl.
CPC ..... *G06K 9/00201* (2013.01); *G06K 9/00362* (2013.01); *G06K 9/00771* (2013.01); *G06K 9/3241* (2013.01); *G06T 7/11* (2017.01); *G06T 2207/10016* (2013.01); *G06T 2207/20084* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 9,965,936 B1 * | 5/2018 | Epps | G08B 21/02 |
| 10,366,586 B1 * | 7/2019 | Leizerovich | G06K 9/00342 |
| 2015/0379356 A1 * | 12/2015 | Nikolova | G01V 3/12 342/90 |
| 2017/0193315 A1 * | 7/2017 | El-Khamy | G08G 1/054 |
| 2019/0258864 A1 * | 8/2019 | Lee | H04N 7/181 |

\* cited by examiner

*Primary Examiner* — Suhail Khan
(74) *Attorney, Agent, or Firm* — Narek Zohrabyan; Phil IP Law Inc.

(57) ABSTRACT

Disclosed herein are technologies for using computer vision for detection of violence, foreseeable, or imminent violence. The technologies can include a real-time human behavior detection system combined with object classification, which is to be used as an intelligent augmentation of security surveillance systems. The technologies can be used with security cameras, surveillance systems or unmanned aerial vehicles. The technologies can use various types of machine learning to enhance the technologies' violence detection. Also, the technologies can use a synergistic approach of combining different computer vision and machine learning technologies to provide highly accurate results.

21 Claims, 6 Drawing Sheets

Generation of the Weapon Probability
206

Repeatedly zoom in on the object that appears to be a weapon
402

Resize an initial image, in the video data, that includes the object that appears to be a weapon
406

Crop the edges off an area, in the resized image, comprising the object
408

Resize the cropped area, such that cropped area becomes a new image
410

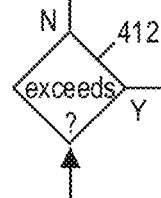

exceeds?
412
N / Y

Generate the weapon probability according to the confidence level once the confidence level exceeds a confidence threshold at block 412
404

FIG. 4

VIOLENCE DETECTION SYSTEM

TECHNICAL FIELD

Embodiments of the disclosure relate generally to using computer vision for detection of violence, foreseeable violence, or imminent violence.

BACKGROUND

Computer vision can be used for violence detection in surveillance videos. Systems employing computer vision can acquire, process, and analyze digital images to detect violence or a situation that is associated with or likely to lead to violence. Computer vision can extract high-dimensional data from images and video and produce numerical or symbolic information that can be used for detection of weapons and violent behavior. In general, computer vision is concerned with artificial visual systems that extract information from images, and such technology can be applied to extraction of data for detecting violence or foreseeable violence. Image data can take many forms, such as video sequences and views from multiple cameras.

In general, a digital image is produced by one or several image sensors, which can include various types of light-sensitive cameras. Depending on the type of sensor, the resulting image data can define 2D or 3D images or a sequence of images such as a video. The images include pixels that can correspond to light intensity.

A digital image can be pre-processed before a computer vision process is applied. Examples of pre-processing include re-sampling to assure that the image coordinate system is correct. Pre-processing can also include noise reduction to assure that sensor noise does not introduce false information as well as contrast enhancement to assure that relevant information can be detected. Pre-processing can also include scale space representation to enhance image structures at locally appropriate scales as well as feature extraction. Feature extractions is usually based on lines, edges and ridges. Localized interest points can include corners, blobs or points. More complex features may be related to texture, shape or motion. At some point, in processing an image, a decision can be made about which image points or regions of the image are relevant for further processing.

The pre-processed image can then be used for image recognition such as classifying a detected object into different categories. Also, decision making can occur according to the processed and classified image. For example, where violence or foreseeable violence is identified in an image, a decision can be made to alert a user of the violence or foreseeable violence.

There are many kinds of computer vision systems; but, in general, most systems include at least a power source, at least one image acquisition device (e.g., camera, CCD, etc.), a processor, and control and communication cables or some kind of wireless interconnection mechanism. In addition, vision systems utilize software as well displays for monitoring environments captured by the systems. Most computer vision systems use visible-light cameras passively viewing a scene at certain frame rates.

Object detection is a computer technology related to computer vision and image processing that deals with detecting instances of semantic objects of a certain class (such as humans, buildings, or cars) in digital images and videos. Object detection can be used for discovering weapons as well. Every object class has its own special features that helps in classifying the class—for example all circles are round. Object class detection uses these special features. For example, when looking for circles, objects that are at a particular distance from a point (i.e. the center) are sought. Similarly, when looking for squares, objects that are perpendicular at corners and have equal side lengths are needed. Similar approaches can be used for detection of more complex objects such as an outline of a gun or knife which includes a combination of more simple shapes.

Processes for object detection can include machine learning-based approaches or deep learning-based approaches. For machine learning approaches, it becomes necessary to first define features of an object in an image, and then machine learning can be used for classification. Deep learning techniques that are able to do end-to-end object detection without specifically defining features, and are typically based on convolutional neural networks (CNN). Example machine learning approaches applied to object detection can include Viola-Jones object detection framework based on Haar features, scale-invariant feature transform (SIFT), and histogram of oriented gradients (HOG) features. Deep learning approaches can include region proposals (e.g., R-CNN, Fast R-CNN, Faster R-CNN), single shot multibox detector (SSD), and you only look once (YOLO).

Images and videos have become bountiful on the Internet and through other sources. Thus, using computer vision on such content can be very beneficial in various fields, including surveillance and security. Computer vision researchers have discovered many solutions for improving computer vision in many different fields. One technique discovered is convolution 3D (C3D), which obtains generic spatio-temporal features by training a deep three-dimensional convolutional network on video data. C3D has certain advantages for object recognition and scene classification in videos, including that it is compact and easy to use and performs at a much higher rate than other known deep-learning solutions for classifying video data.

A problem with applying computer vision in general and especially some of the aforementioned techniques is that a video stream usually has an immense number of frames to be processed. Known computer vision algorithms, no matter how advanced, are based on statistical approaches in which there are finite accuracy, precision and recall characteristics to it. And, even the classification tasks (which is considered easier to approach then object detection tasks) may only have accuracy numbers at 96-98% at best. As for the great number of frames to analyze, even with a video rate reduce to five frames per second, a daily number of frames can be in the hundreds of thousands. Or, millions with a significant set of cameras providing video data.

Thus, the algorithms that deal with frames separately are facing the challenge of either very low sensitivity or a high false omit rate (number of false alarms a day). Some competing technologies are trying to solve this issue by introducing additional checks, including pose estimation, person position identification, just to name a few. And, these solutions, which can be commercially inefficient and resource demanding have not shown promising results in versatile field scenarios; especially with violence detection and foreseeable violence detection.

Moreover, many of the object detection techniques are barely reaching usual video frames-per-second metrics, even with some of the highest performing hardware specifications existing currently.

SUMMARY

Disclosed herein are technologies for using computer vision for detection of violence, foreseeable, or imminent violence. The embodiments disclosed herein provide specific technical solutions to at least the technical problems mentioned in the background section and other parts of the application as well as other technical problems not described herein but recognized by those of skill in the art.

The technologies can include a real-time human behavior detection system combined with object classification which is to be used as an intelligent augmentation of security surveillance systems. The technologies can be used with security cameras, surveillance systems or unmanned aerial vehicles (e.g., military drones) to track, detect and target people who are classified for demonstrating violent behavior or behavior associated with foreseeable or imminent violence such as carrying a weapon. The technologies can use various types of machine learning to enhance the technologies' violence detection. Also, the technologies can use a synergistic approach of combining different computer vision and machine learning technologies to provide highly accurate results.

To be commercially viable, developers of computer vision systems (especially for security surveillance) need to reduce resource requirements. An example way to reduce resource requirement is by using a reduce version of known techniques for analyzing images, such as a reduce version of YOLO. A single reduced version of a known solution or multiple reduced versions of known solutions can be used separately and then output(s) of such solution(s) can be used for a single or multiple factor based determination. In general, such as technique can reduce processor use do to less complex machine learning techniques used in parts. Also, performance of computer vision systems can be increased using such techniques. This may be a tradeoff with accuracy. However, performance may be preferred over accuracy in a security application, where time taken in discovering violence or looming violence is mission critical. For example, when artificial neural networks are used as a computer vision analysis solution, a smaller and less complex artificial neural network (ANN) can be advantageous over a more complex one.

The systems and methods described herein leverage simpler formed circuitry for determining separate factors in an ultimate decision as to whether video data includes content with violence or imminent violence. The systems and methods can utilize separate weapon detection circuitry and separate violent behavior detection circuitry to produce scores that provide likelihoods of different factors associated with detecting violence, foreseeable violence or imminent violence. Decision circuitry can use such inputs to process video data to determine and output a violence detection probability. And, such a violence detection probability or score can be used as a basis for providing an alert.

In some example embodiments, the technologies include a method including identifying, by weapon detection circuitry (WDC), in content of video data, an object that appears to be a weapon. The object is then compared to a predetermined weapon, such as a predetermined weapon stored in a database. The WDC can then generate a weapon probability according to the comparison and communicate the weapon probability to decision circuitry (DC). It is to be understood that in some example embodiments, the comparison is not a direct comparison between the object and a predetermined weapon. For example, an ANN can be trained by data related to a predetermined weapon, such as a predetermined weapon stored in a database. Then, the object can be compared to the predetermined weapon by inputting data related to the object into the ANN. The ANN then outputs the weapon probability or some other value that is then used as a basis for the weapon probability.

The method can also optionally include classifying, by violent behavior detection circuitry (VBDC), the video data according to an extent in which the video data includes content associated with violent behavior. The VBDC can then generate a violent behavior probability according to the classification of the video data and communicate the violent behavior probability to the DC. The DC can then receive the weapon probability and optionally the violent behavior probability and determine (such as through machine learning or hard-coded instructions) a violence detection probability according to the weapon probability and optionally the violent behavior probability. The DC can then communicate the violence detection probability to alert circuitry. The alert circuitry can trigger an alert according to the violence detection probability.

Some of the technologies described herein include a computer system or a non-transitory computer readable medium. The computer system or the non-transitory computer readable medium can implement at least some of the features and operations described herein including the aforesaid method. In some embodiments, the medium can specifically be implemented by memory of the computer system. The computer system can also include at least one processing device.

BRIEF DESCRIPTION OF THE DRAWINGS

The present disclosure will be understood more fully from the detailed description given below and from the accompanying drawings of various embodiments of the disclosure.

FIG. 4 is a flow diagram of an example method for generation of the weapon probability, which can be a factor in the determination of the violence detection probability, in accordance with some embodiments of the present disclosure.

DETAILED DESCRIPTION

Figure 1:
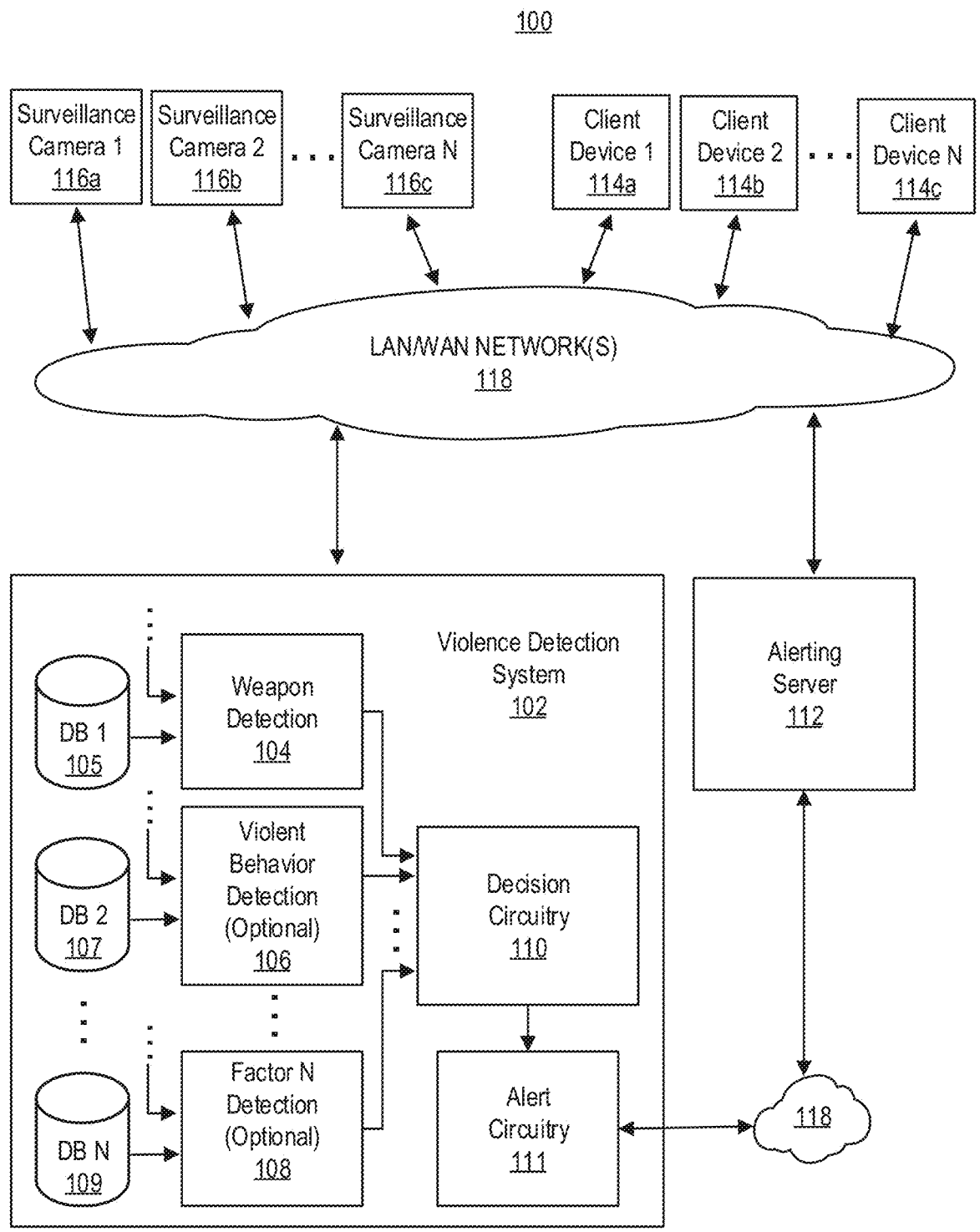
FIG. 1 illustrates an example network of computer systems to implement technologies for using computer vision for detection of violence, foreseeable violence, or imminent violence, in accordance with some embodiments of the present disclosure.

Disclosed herein are technologies for using computer vision for detection of violence, foreseeable violence, or imminent violence. At least some of the technologies disclosed herein can be embodied in a violence detection system. The embodiments disclosed herein provide specific technical solutions to at least the technical problems mentioned in the background section and other parts of the application as well as other technical problems not described herein but recognized by those of skill in the art.

The technologies can include a real-time human behavior detection system combined with object classification which is to be used as an intelligent augmentation of security surveillance systems. The technologies can be used with security cameras, surveillance systems or unmanned aerial vehicles (e.g., military drones) to track, detect and target people who are classified for demonstrating violent behavior or behavior associated with foreseeable or imminent violence such as carrying a weapon. The technologies can use various types of machine learning to enhance the technologies' violence detection. Also, the technologies can use a synergistic approach of combining different computer vision and machine learning technologies to provide highly accurate results.

To be commercially viable, some embodiments described herein leverage one or more computer vision systems used for security surveillance with reduced resource requirements. The systems can reduce resource requirements by using a reduce version of known techniques for analyzing images, such as a reduce version of YOLO. A single reduce version of a known solution or multiple reduced versions of known solutions can be used and then output(s) of such solution(s) can be used for a single or multiple factor based determination. In general, such a technique can reduce processor use do to less complex machine learning techniques used in parts. Also, performance of computer vision systems can be increased. This may be a tradeoff with accuracy. However, performance may be preferred over accuracy in a security application, where time taken in discovering violence or foreseeable violence is mission critical. For example, when artificial neural networks are used as a computer vision analysis solution, a smaller and less complex ANN can be advantageous over a more complex one.

The systems and methods described herein leverage simpler formed circuitry for determining separate factors in an ultimate decision as to whether video data includes content with violence or foreseeable violence. The systems and methods can utilize separate weapon detection circuitry and optionally separate violent behavior detection circuitry to produce scores that provide likelihoods of different factors associated with detecting violence or foreseeable violence. Decision circuitry can use such inputs to process video data to determine and output a violence detection probability. And, such a probability or score can be used as a basis for providing an alert.

An object detection module (ODM), which can be or include weapon detection circuitry (WDC), is a computer vision module that can find predefined objects in selected frames from a video stream. The object detection module can be based on YOLO or a reduced and simpler version of YOLO. In some embodiments, such as embodiments were the ODM uses an ANN, a final layer of the ODM can be trained to distinguish weapons using a dataset and images created by the administrator of the ODM or from images crawled from the Internet. The following objects can be detected by the ODM: a gun, a knife, a gun in a straightened arm, and a knife in a hand in a threatening position. This is just to name a few of the objects associated with violence that the ODM can detect. In some embodiments, a video stream can be dissected into chunks of predefined length (e.g., a chunk with a length of time=2 seconds, and 10 frames from 2-second length of video) and n frames are selected from m=fps*t to be forwarded to ODM module, where fps is frames per second. Each frame can output the object with the highest probability of certainty as well as a bounding box can be generated and can surround the detected object. The probabilities and other values can be forwarded to a smart decision making module (SDMM) to attribute to a final decision on whether violence, foreseeable violence, or looming violence exists in the video data analyzed. The SDMM can be or include decision circuitry (DC).

A violence detection module (VDM), which can be or include violent behavior detection circuitry (VBDC), is a computer vision module for video classification. In some embodiments, the VDM can be at least partially implemented using a scripting language such as PYTHON. The ODM can also be at least partially implemented using a scripting language. The VDM can use a modified C3D video classification. The VDM can use a pre-trained neural network of the modified C3D or another system of video classification. The video classification used can support three-dimensional convolutional networks. For example, C3D can be used to efficiently train, test, and fine-tune such networks. The modified C3D can extract a feature vector from a chunk of a video and can output a probability value (e.g., the value can be in a range of 0 for non-violence up to 1 for violence). VDM is used on video sets that are aggregated from self-recorded scenes and/or crawled videos from the Internet. Videos of training sets can be filtered and moderated to contain only the actions of interest. The output of each chunk from the VDM can be is forwarded to the SDMM to attribute to the final decision on whether violence, foreseeable violence, or looming violence exists in the video data analyzed.

The SDMM, which can be or include decision circuitry, can stand on top of ODM and VDM and can receive inputs from the ODM and VDM as well as inputs from other analytics modules associated with detection of violence, foreseeable violence, or impending violence. The SDMM is engaged after the analysis of each chunk of the video is completed and sets of inputs received. In some embodiments, the SDMM can include a three-layer neural network that takes as an input outputs aggregated from last k video chunks (e.g., overall i=k*(n+1) values) and outputs a violence detection probability (e.g., 0 for non-violence through 1 for certain violence). The hidden layer in the ANN can include four nodes, for example. In other embodiments, the determination of the violence detection probability can be hard coded (which is described further herein). A weight matrix can be trained based on trained and/or predefined video sets and can be further tuned and customized according to different use cases. The SDMM can tune the sensitivity of the detection mode and the SDMM loads one of the predefined weight matrix optimized for specific surveillance modes.

For the purposes of this disclosure, it is to be understood that a chunk of video is a fragment of information from a video—such as digital video having a digital video format. Each chunk described herein can contain a header which indicates some parameters (e.g. the type of chunk, comments, size etc.). In the body of the chunk there can be a variable area containing data which are decoded by the program or system using the chunk from the parameters in the header.

The output of SDMM (e.g., the violence detection probability) can be used to trigger an alert of violence, foreseeable violence, or looming violence. In some embodiments, a simple threshold number will be used to trigger the alerting actions. In some more sophisticated embodiments, a range of alert types can be triggered depending on SDMM output. The alert level can then send to an alerting server along with the analyzed video data and/or frames having the detected threatening object or behavior. The alert can also include with the alert level, a source of the video data and/or frames, such as a geolocation or device identification code of a source camera. The alerting server can forward the value of alert level to one or more assigned clients connected to the server, such as assigned applications (e.g., assigned mobile apps).

An assigned client application or mobile app can be part of a client device that receives alerting notifications from the alerting server. A notification can be displayed on a monitor of a client device and can include a color code to be displayed. In some embodiments, two colors can be used. For example, orange can be used as a moderate probability and red for a high probability of detected violence, foreseeable violence, or looming violence. Opening the application by the user, the user can be shown a number corresponding to the certainty of detection of violence, foreseeable violence, or looming violence (e.g. a number in a range of 70-100% or 0.7-1), as well as be shown the time of detection and the source of the video (e.g., codename of camera or geolocation of camera). The client device can also receive from the server and show a thumbnail of a frame for selection by the user that includes a detected weapon or concerning behavior. Using the application, a user can browse through a log of the recent detections (which can be shown as read or unread). By selecting on a notification, the user can then have the option of viewing a full scaled frame, dismissing it or engaging a smart suspect identification system (SSIS) procedure.

The SSIS procedure can be implemented by a SSIS module running on a separate server and can be used to identify the people captured in images having threatening objects or human behavior. The SSIS can include a face detection module (FDM) and a facial recognition module (FRM). Both modules are based on computer vision algorithms. FDM works autonomously, it provides bounding boxes around faces in a video frame. In some embodiments, in case of several detected faces only the ones that are near to a detected weapon or concerning behavior are selected by the module. FRM module uses a database of faces of suspects provided by relevant authorities. It uses a smart matching algorithm and selects the individuals with faces matching to the one provided. If the probability of matching is above a predefined threshold, a report can be sent to the application form the SSIS module. The report can include a suspect ID, a cropped image from the original frame and the probability of a match.

FIG. 1 illustrates an example network of computer systems 100 to implement technologies for using computer vision for detection of violence, foreseeable violence, or imminent violence, in accordance with some embodiments of the present disclosure. The example network of computer systems 100 can implement any of the aforesaid components and operations as well as any component or operation described herein.

The network of computer systems 100 is shown including a violence detection system 102. The violence detection system 102 is shown including weapon detection circuitry 104. The network of computer systems 100 can also optionally include a violent behavior detection system 106 and/or additional violence factor detection circuitry 108 (which can detect another factor for identifying violence, foreseeable violence or looming violence). The violence detection system 102 is also shown including decision circuitry 110 which is shown as connected to and receiving inputs from weapon detection circuitry 104, optionally violent behavior detection system 106, and optionally additional violence factor detection circuitry 108. As shown, the decision circuitry 110 can be connected to and receive inputs from additional modules and/or circuits outputting values representative of factors for identifying violence, foreseeable violence or looming violence in video data. Also, as shown, each of the circuitry for generating and outputting values representative of factors for identifying violence, foreseeable violence or looming violence in video data is connected to and can receive historical data from corresponding databases (e.g., databases 105, 107, and 109).

The network of computer systems 100 is also shown including an alerting server 112 as well as client devices that can receive alerts from the alerting server (e.g., see client devices 114a, 114b, and 114c). The network of computer systems 100 is also shown including a plurality of surveillance cameras (e.g., see surveillance cameras 116a, 116b, and 116c).

The network of computer systems 100 is also shown including one or more LAN/WAN networks 118 which are shown communicatively coupling the violence detection system 102, the alerting server 112, the client devices, and the surveillance cameras. The LAN/WAN network(s) 118 can include one or more local area networks (LAN(s)) and/or one or more wide area networks (WAN(s)). The LAN/WAN network(s) 118 can include the Internet and/or any other type of interconnected communications network. The LAN/WAN network(s) 118 can also include a single computer network or a telecommunications network. More specifically, the LAN/WAN network(s) 118 can include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN.

At least each shown component of the network of computer systems 100 can be or include a computer system which can include memory that can include media. The media can include or be volatile memory components, non-volatile memory components, or a combination of such. In some embodiments, the memory is a storage system. An example of a storage system is a SSD. In some embodiments, the memory is a hybrid memory/storage sub-system. In general, each of the computer systems can include a host system that uses the memory. For example, the host system can write data to the memory and read data from the memory.

The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system and the memory. The host system can further utilize an NVM Express (NVMe) interface to access memory components when the memory is coupled with the host system by the PCIe interface. The physical host interface can provide an interface for passing control, address, data, and other signals between the memory and the host system.

The memory components can include any combination of the different types of non-volatile memory components and/or volatile memory components. An example of non-volatile memory components includes a negative-and (NAND) type flash memory. Each of the memory components can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system. Although non-volatile memory components such as NAND type flash memory are described, the memory components can be based on any other type of memory such as a volatile memory. In some embodiments, the memory components can be, but are not limited to, random access memory (RAM), read-only memory (ROM), dynamic random-access memory (DRAM), synchronous dynamic random-access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components can be grouped as memory pages or data blocks that can refer to a unit of the memory component used to store data.

A memory system controller (hereinafter referred to as "controller") can communicate with the memory components to perform operations such as reading data, writing data, or erasing data at the memory components and other such operations. The controller can include hardware such as one or more integrated circuits and/or discrete components, a buffer memory, or a combination thereof. The controller can be a microcontroller, special purpose logic circuitry (e.g., a field programmable gate array (FPGA), an application specific integrated circuit (ASIC), etc.), or other suitable processors. The controller can include a processor (processing device) configured to execute instructions stored in local memory. In the illustrated example, the local memory of the controller includes an embedded memory configured to store instructions for performing various processes, operations, logic flows, and routines that control operation of the memory, including handling communications between the memory and the host system. In some embodiments, the local memory can include memory registers storing memory pointers, fetched data, etc. The local memory can also include read-only memory (ROM) for storing micro-code. The example memory can include the controller, or in another embodiment of the present disclosure, the memory may not include a controller, and can instead rely upon external control (e.g., provided by an external host, or by a processor or controller separate from the memory).

In general, the controller can receive commands or operations from the host system and can convert the commands or operations into instructions or appropriate commands to achieve the desired access to the memory components. The controller can be responsible for other operations such as wear leveling operations, garbage collection operations, error detection and error-correcting code (ECC) operations, encryption operations, caching operations, and address translations between a logical block address and a physical block address that are associated with the memory components. The controller can further include host interface circuitry to communicate with the host system via the physical host interface. The host interface circuitry can convert the commands received from the host system into command instructions to access the memory components as well as convert responses associated with the memory components into information for the host system.

The memory can also include additional circuitry or components. In some embodiments, the memory can include a cache or buffer (e.g., DRAM) and address circuitry (e.g., a row decoder and a column decoder) that can receive an address from the controller and decode the address to access the memory components.

In some aspects of the present disclosure, the memory includes the violence detection system 102. In some embodiments, the controller includes at least a portion of the violence detection system 102. For example, the controller can include a processor (processing device) configured to execute instructions stored in local memory for performing the operations described herein such as the operations described herein associated with the violence detection system 102. In some embodiments, the violence detection system 102 is part of the host system, an application, or an operating system.

The violence detection system 102, can use the memory, the memory components, and the host system to implement technologies for using computer vision for detection of violence, foreseeable violence, or imminent violence.

Further details with regards to the operations of the violence detection system 102 are described below. As shown in FIG. 1, the network of computer systems 100 can include the violence detection system 102.

The violence detection system 102 can include weapon detection circuitry 104 that can be configured to identify, in content of video data (such as content of a chunk of a video), an object that appears to be a weapon using a computer vision system. The computer vision system can be YOLO or a reduced or simplified version of YOLO. The identification of an object that appears to be a weapon can include separating a video stream from one or more video cameras into parts of the video stream including the video data. The video stream can be separated into chunks of video of a predefined length (e.g., length in time, t=2 seconds) and a predefined number of frames can be selected from a chunk of video. The frames can be selected according to the following formula, m=fps*t, where m is number of frames, fps is frames per second, and t is time. In some embodiments, as described herein, the output and input of the weapon detection circuitry 104 or ODM can allow for zoom-in-tracking. Zoom-in-tracking is where the object suspected of being a weapon is repeatedly enlarged an analyzed until there is a certain amount of confidence that the object is or is not a weapon. Also, in some embodiments, the circuitry can also apply gamma correction to each frame that is sent to the computer vision system for enhanced weapon detection.

In some embodiments, zoom-in-tracking can include conditional zooming. Conditional zooming can be used when it is probable that a weapon has been detected. For example, when the probability of weapon detection occurs over a threshold, a next frame in a sequence of image frames is not provided as a whole but as a zoomed-in image on the area of the probable weapon. The benefit of the conditional zooming is the omitted resizing of the entire next image frame. Also, the conditional zooming is beneficial with a large amount of high resolution images in real time.

The zooming in on the probable weapon provides a smaller amount of data to process. This can increase the efficiency of the processing of the data related to the probable weapon, such as processing by an ANN or processing by YOLO or a derivative of YOLO. Also, images inputted into YOLO or a derivative of YOLO often are resized, e.g., resized to 416×416 pixels. The resized images can reduce overall accuracy of the detection of weapons. However, by implementing conditional zooming, the reduction in accuracy can be limited. The conditional zooming also allows for more efficiently processing of high-resolution video streams such as 4K streams from a drone. The zooming-in sequence helps to zoom in on the suspicious object and/or person and improve the detection accuracies as well as reduce processing resources used.

Also, in some embodiments having conditional zooming, prior to generating a zoom-in image, the initial image to be zoomed in on is not cropped in any way. The area corresponding to the cropped region (or the region having the probable weapon) is selected in a next image after the initial image. This is beneficial in that it prevents the conditional zooming from interfering with other steps in processing the initial image with a probable weapon.

The weapon detection circuitry 104 can also be configured to compare the object to a predetermined weapon. The predetermined weapon can be stored in a database (e.g., database 105) of historical data and images that is generated by the system or retrieved from another source such as the Internet. It is to be understood that in some example embodiments, the comparison is not a direct comparison between the object and a predetermined weapon. For example, an ANN can be trained by data related to a predetermined weapon, such as a predetermined weapon stored in a database. Then, the object can be compared to the predetermined weapon by inputting data related to the object into the ANN. The ANN then outputs the weapon probability or some other value that is then used as a basis for the weapon probability.

The weapon detection circuitry 104 can also be configured to generate a weapon probability according to the comparison. The probability can be a value in a range of 0 for non-weapon up to 1 for a predetermined weapon (such as a known weapon stored in the database 105). The circuit can be enhanced by training a layer of computer vision to identify a weapon using a dataset generated from video and still images retrieved from the Internet. For example, this can include training a layer of an ANN of a computer vision system. The images used for the comparison against the detected object can include images with weapons in different environments or backgrounds or situations or context. Also, images of weapons can include images of guns, knives, guns in a straightened arm, and knives in a hand in threatening position, just to name a few. For example, a chunk of ten video frames corresponding to two seconds of video (which can be subject to adjustment) can be treated in a batch and the historical data related to the chuck can also be taken into account. Such a feature can be combined with the zoom-in-tracking process described herein to process the video data to output an effective weapon probability.

In some embodiments, in the generation of the weapon probability, the weapon detection circuitry 104 is configured to repeatedly zoom in on the object that appears to be a weapon and analyze the zoomed-in object to determine a confidence level that the object is a weapon or not a weapon. Also, the weapon detection circuitry 104 can be configured to generate the weapon probability according to the confidence level once the confidence level exceeds a confidence threshold.

In some embodiments, in the zooming in on the object, the weapon detection circuitry 104 is configured to resize a first image, in the video data, that has the object that appears to be a weapon, such that the resized first image has a first certain number of pixels. The weapon detection circuitry 104 can also be configured to crop the edges off an area (e.g., the area defined by a bounding box), in the resized first image, having the object. The weapon detection circuitry 104 can also be configured to resize the cropped area, such that cropped area becomes a second image including a second certain number of pixels. In some instances of the system, the first certain number of pixels is the same as the second certain number of pixels.

In some embodiments, the aforementioned zoom-in-tracking processing of the video data can greatly enhance the eventual output of the violence detection system 102. It can improve the accuracy and sensitivity of the output. In some examples, the frames from the video data used by YOLO or a reduced version of YOLO to detect the possibility of any classes YOLO or reduced YOLO is trained on. A reduce YOLO can have a small ANN model which makes it more commercially viable. In reduced YOLO any image is resized (such as resized to 414×414 pixel size). The threshold of confidence that triggers the detection is set low. If an object of interest is detected (suspected at this step) in frame i, the coordinates of detection are noted. The next frame i+1 is cropped in a predetermined resizing shape (e.g., 414×414 pixel size shape) around the detected object. And, if a weapon is detected within the cropped area, the coordinates of detection are applied to i+2nd frame for cropping, etc. A continuous subset of such zoomed-tracked detections can be used to trigger the detection. Such an approach resolves some the oversimplification problems associate with a reduced version of YOLO. By applying zoom-in-tracking processing, the system can analyze high-resolution frames and not lose the information while shrinking that area to be analyzed in the original image. Moreover, this approach allows the system to analyze super-high-resolution images (e.g., 4K resolution from drones) with no loss of quality due to downsizing of image.

In some embodiments, the system can apply the zoom-in-tracking processing to footages from drones. Drones can have a resolution of 4K or more. When using the zoom-in-tracking processing in this context, the suggested algorithm is as follows: 4K+ resolution image is divided into six or more panels circling through which ODM is applied. Whenever a detection of weapon is suspected, the system can crop off the next frame around the assumed location and the location is analyzed. The sequence of the desired length of detections of the object is sought to trigger the detection of violence.

In some embodiments, in the generation of the weapon probability, the weapon detection circuitry 104 is configured to identify using computer vision, in content of video data, a combination of the object that appears to be a weapon and a body part of a person carrying the object. The weapon detection circuitry 104 can also be configured to compare the identified combination to a predetermined combination of a weapon and a body part of a person carrying the weapon. The weapon detection circuitry 104 can also be configured to generate the weapon probability according to the comparison between the identified combination and the predetermined combination. For detection of smaller objects that are rather easy to false detect or miss, such as a gun in the arm, the aforesaid operations can be used. The system is using two conjugated classes: one is the object itself, and the other is the object with the arm or other body part. In case of a gun, one class is the "gun" in the hand up to the palm-arm junction, while the other is the "gun" in the hand and the whole arm up to the shoulder. The decision of detecting the gun will be based on the detection of both classes in the chunk. The similar approach is used when detecting a knife in the hand. Detection of a rifle may not need the "arm" counterpart considering the size of a rifle.

It is to be understood that in some example embodiments, the comparison is not a direct comparison between the identified combination and the predetermined combination. For example, an ANN can be trained by data related to a predetermined combination of a weapon and a body part of a person carrying the weapon, such as a predetermined combination of a weapon and a body part of a person carrying the weapon stored in a database. Then, the identified combination can be compared to the predetermined combination by inputting data related to the identified combination into the ANN. The ANN then outputs the weapon probability or some other value that is then used as a basis for the weapon probability.

The weapon detection circuitry 104 can also be configured to communicate, to decision circuitry (e.g., decision circuitry 110), the generated weapon probability.

The violence detection system 102 can also optionally include violent behavior detection circuitry 106 that can be configured to classify video data (such as a chunk of a video) according to an extent in which the video data includes content associated with violent behavior using a video classification system (which is a type of computer vision system). The violent behavior detection circuitry 106 or the VDM can be based on a C3D video classification algorithm or a derivative of a C3D video classification algorithm. The violent behavior detection circuitry 106 or the VDM in some embodiments acts as a supplement to the weapon detection circuitry 104 or the ODM. The violent behavior detection circuitry 106 can be tuned to work with high recall, in which it is not to miss violence or acts that lead to violence while blocking as much of generic acts as possible. If the circuitry or model is well trained, a value calculated from the analyzed video data or chunk. If the C3D model is not performing reliable enough (such as a model newly trained on specific action with scarce dataset), the violent behavior detection circuitry 106 or the VDM can use averaging from last K video data sets or chunks. In such examples or scenarios, the violent behavior detection circuitry 106 or VDM is based on a moving average of C3D outputs.

In embodiments with the classification be according to C3D video classification system, an open-source code and/or a pre-trained neural network can be used from the classification system. In such embodiments, the classification by the video classification system can extract a feature vector from the video data or chunk. And, the classification system can include a layer that is trained by video data to identify violent behavior using a dataset generated from the video data or chunk and related images and video. The related images and video can be produced by users or administrators of the system or retrieved from the Internet.

The violent behavior detection circuitry 106 can also be configured to generate a violent behavior probability according to the classification of the video data or chunk. In some example, the probability is in a range of 0 for non-violent behavior up to 1 for certain violent behavior or certain behavior that leads to violence.

The violent behavior detection circuitry 106 can also be configured to communicate, to the decision circuitry (e.g., decision circuitry 110), the generated violent behavior probability. The violent behavior detection circuitry 106 can use the history of violent behavior detections in historical video which can be received from a database of video data such as DB 107. In some embodiments, when the violent behavior detection circuitry is not performing in line with expectations, the probabilities and data derived from previous chunks of video can be used to further enhance the circuitry. The circuitry can become more effective with more historical video input from the database or another source.

The violence detection system 102 can also include the decision circuitry 110 that can be a part of or the whole of the SDMM and can be configured to receive, from the weapon detection circuitry 104, a first input including the weapon probability. The weapon probability can be based on a set of chunks of video processed by the weapon detection circuitry 104 and the weapon probability can be received by the decision circuitry 110 after the set is processed by the weapon detection circuitry and the weapon probability is outputted by the weapon detection circuitry accordingly. The decision circuitry 110 can also be configured to receive, from the violent behavior detection circuitry 106, a second input including the violent behavior probability. The violent behavior probability can be based on a set of chunks of video processed by the violent behavior detection circuitry 106 and the violent behavior probability can be received by the decision circuitry 110 after the set is processed by the violent behavior detection circuitry and the violent behavior probability is outputted by the violent behavior detection circuitry accordingly.

The decision circuitry 110 can also be configured to determine, according to machine learning, a violence detection probability according to the first input and the second input. The decision circuitry 110 can then output the violence detection probability. The probability can be in a range of 0 for non-violence up to 1 for violence or certain foreseeable or looming violence. Also, the decision circuitry 110 can be configured to communicate, to alert circuitry, the violence detection probability to trigger an alert.

In some embodiments, the determination of the violence detection probability is based on an artificial neural network (ANN). For example, the determination of the violence detection probability can be based on a three-layer neural network that takes as inputs outputs from the weapon detection circuitry 104 and the violent behavior detection circuitry 106. The outputs can be based on video data aggregated from last k video chunks, wherein overall i=k*(n+1) values. In embodiments where the decision circuitry 110 is using an ANN, the hidden layer of the three-layer neural network can include a plurality of nodes, such as four nodes. A weight matrix of the ANN can be trained based on predefined video sets and/or images. The images of the video data can be processed by the weapon detection circuitry 104. The set of chunks of video can be processed by the violent behavior detection circuitry 106. And, the decision circuitry 110, for example, can further tune and customize according to different scenarios and/or machine learning via the ANN. For example, the decision circuitry 110 can fine-tune its analysis and output based on machine learning for each of the different scenarios. The different scenarios can be common violent and non-violent scenarios. To tune the sensitivity of the detection mode, the decision circuitry 110 can also load a predefined weight matrix optimized for a specific type of surveillance mode configured for different types of monitored environments and situations or scenarios in such environments.

In some embodiments, the decision circuitry 110 can be configured to determine, according to static logic (or logic that is not learning through machine learning), a violence detection probability according to the first input and the second input. This simpler approach for determining the violence detection probability may be more efficient than using an ANN. The SDMM or the decision circuitry 110 can also use a combination of static logic or hard-coded logic and a ANN or other form of machine learning.

In embodiments where the SDMM or the decision circuitry 110 use hard-coded logic, an alert is triggered if the hard-coded conditions are satisfied in the processing by the SDMM or the decision circuitry. A hard-coded condition can optionally be or include that the output of the VDM (or violent behavior detection system 106) exceeds a threshold value. For example, the condition being that the output of violent behavior detection circuitry 106 exceeds a threshold value for violent behavior detected.

A hard-coded condition can be or include that the output of the ODM (or weapon detection circuitry 104) exceeds a threshold value. For example, the condition being that the output of weapon detection circuitry 104 exceeds a threshold value for a weapon detected. In some embodiments, the condition of the hard-coded logic can include determining a number of adjacent occurrences of a suspected weapon object analyzed to have confidence values that exceed a corresponding threshold value for an actual instance of the weapon. The adjacent occurrences can be derived from the video data or a chunk as a result of zoom-in-tracking processing. And, the number of adjacent occurrences can be a basis for the output of the weapon detection circuitry 104 (e.g., the basis for the generated weapon probability). Also, all the occurrences of the detected object in the video data or chunk (not just the adjacent occurrences) can be considered in the determination of the output of the weapon detection circuitry 104, in some embodiments.

A hard-coded condition can be or include that the output of the ODM (or circuitry 104) exceeds a threshold value as well. In some embodiments, the condition of the hard-coded logic can include determining a number of adjacent occurrences of a suspected weapon object as it is held by a person analyzed to have confidence values that exceed a corresponding threshold value for an actual instance of the weapon held by a person in a certain way. The adjacent occurrences of these combined features can be derived from the video data or a chunk as a result of zoom-in-tracking processing as well. And, the number of adjacent occurrences of these combined features can be a basis for the output of the weapon detection circuitry 104 (e.g., the basis for the generated weapon probability). Also, all the occurrences of the detected object and body part of holder of the object in the video data or chunk (not just the adjacent occurrences) can be considered in the determination of the output of the weapon detection circuitry 104, in some embodiments.

The hard-coded logic and its conditions can be part of the SDMM or decision circuitry 110 and can result from experimental probing. For example, with the adjusted hyperparameters, SDMM allows detecting objects of interest in more than 50% of true positive cases. For instance, this can occur in every second video chunk, which is equal to approximately one detection in every 4 seconds if the length of a chunk is 2 seconds. And, this can reduce the number of false positives to less than 0.1%. The hyperparameters are pre-estimated on a dataset of videos and can be used for fine-tuning the overall precision and recall of the SDMM or decision circuitry 110.

As mentioned, the decision circuitry 110 can be configured to communicate, to alert circuitry, the violence detection probability to trigger an alert. In some embodiments, along with the output of the SDMM or the decision circuitry 110, a set of jury checkers can be implemented to check the detections before sending out the alert. In embodiments using jury checkers, a set of jury checkers can be assembled on a separate server. The jury checkers filter out false positives and can reduce the number of false positives to 0.02% while retaining the sensitivity level.

According to recent tests, the best performance of the hard-coded embodiment of the decision circuitry 110 or the SDMM is achieved when an assembly of different approaches is used. Every single module of the approaches can be tuned to highest recall and the alert is sent out when the output of all jury members is a TRUE result. The juries or other approaches recently implemented are YOLO and Faster R-CNN. But, any type of image or video classifier can be used as a jury member or approach. For example, machine learning approaches applied to object detection can be used and included, for example, Viola-Jones object detection framework based on Haar features, scale-invariant feature transform (SIFT), and histogram of oriented gradients (HOG) features can be used. Also, deep learning approaches applied to object detection and behavior detection can be used and include, for example, region proposals (e.g., R-CNN, Fast R-CNN, Faster R-CNN), single shot multibox detector (SSD), and you only look once (YOLO) can be used. In some embodiments, in the cases of use of YOLO and Faster R-CNN, a crop (e.g., a crop of 608×608 pixels) is taken around the suspected object from the image with the highest confidence identified. For the image classifier, the crop of the suspected object itself is formed and probed. All modules are trained using the same dataset modified accordingly (e.g., the modification occurring by crops and augmentation).

In some embodiments, the set of jury checkers can receive the output of the SDMM, and only if the set of jury checkers confirm that a weapon is detected in the video data is the violence detection probability or the output of the SDMM sent to alert circuitry 111 to trigger an alert. The members of the set of jury checkers can be tuned to have high recall in that they do not to miss a true positive. The members of the set of jury checkers can also filter out a portion of false positive.

In some embodiments, a hard-coded version of the decision circuitry 110 or the SDMM can include conditions based on three gun-related probabilities and conditions. One condition being that the probability of gun detection in an image exceeds a respective threshold. And, two other conditions being that respective probabilities of gun detection for two different degrees of zoomed images exceed respective thresholds. Also, the hard-coded version can include a condition based on the probability of gun and arm detection exceeding another respective threshold. The hard-coded version can also include other conditions based on respective probabilities of gun and arm detection for two different degrees of zoomed images exceed respective thresholds.

The hard-coded version can also include another condition based on a respective probability of gun detection exceeding a maximum threshold.

In some embodiments, the decision circuitry 110 or SDMM can include circuitry that can make a decision based on a batch of numbers input to an ANN which is pre-trained on outputs from predefined datasets. The outputs for pre-training the ANN can include outputs from the ODM or WDC which can include confidence values of all detected objects, bounding boxes of the detected objects, and/or information whether the frame was zoomed in or not. These outputs can be piped into the decision circuitry 110 or SDMM. And, a single probability can be outputted from the decision circuitry 110 or SDMM based on the ANN.

The violence detection system 102 can also include alert circuitry 111. The alert circuitry 111 can be configured to receive, from the decision circuitry 110, the violence detection probability. The alert circuitry 111 can also be configured to compare the violence detection probability to a threshold. The alert circuitry 111 can also be configured to trigger an alerting action according to the comparison between the violence detection probability and the threshold. In some embodiments, a simple threshold can be used to compare against the violence detection probability to trigger an alerting action. In some embodiments, a range of alert types can be triggered depending on multiple thresholds and comparisons of the violence detection probability against the multiple thresholds.

In some embodiments, the triggering of the alerting action occurs by the alert circuitry 111 communicating an alert notification to an alerting server (e.g., alerting server 112) over LAN/WAN network(s) 118. In some embodiments, the violence detection system 102 can include the alerting server. In either example, the alerting server can be configured to communicate, to a plurality of client devices (e.g., client devices 114a, 114b, and 114c), the alert notification or a derivative thereof.

In some embodiments, an alert and/or an alert level can be sent to the alerting server along with the video data or processed version of the video data emphasizing violent behavior and/or objects of concern. Also, geolocation of the source of the video data, such as the source camera(s) of the video data, can be sent along with the alert/alert level. The alerting server can forward such information to the assigned clients. The clients can be applications (such as mobile applications) connected to the alerting server. An application, such as a mobile app, can be the client that receives alerting notifications from the alerting server. The notification can include a color code that is displayed. In an example embodiment, two colors can be used—e.g., orange for a moderate probability of violence and red for a high probability of violence.

With opening the application, the user can be shown the number corresponding to the violence detection probability (e.g. 70-100% or 0.7-1), time corresponding to the violence detection probability, and one or more of video data source identification and geolocation corresponding to the violence detection probability. Also, parts of the video and the images with the probable weapon and/or violent behavior can be shown with the application. For example, via the app, such content can be selected via thumbnail images.

With the app, a user can also browse through the log of some or all the detections having an associated violence detection probability. The detections in the log can be listed and/or shown as read or unread. By selecting the notification in the app, the user can have many options for viewing video and images corresponding to a detection of violence or possible violence.

Also, the application can provide, with each detection with a possible suspect, a link to a suspect identification system. A suspect identification system can interoperate with the app and the violence detection information retrieved from the system. The app can include options for the user to engage different variations of the aforesaid features.

A suspect identification system can run on a separate server from the alerting server and can be used to identify the people caught on violence and/or threat imposing images. The suspect identification system can include a face detection system and a facial recognition system. Both types of systems can include computer vision algorithms. The face detection system can operate autonomously, and it can retrieve images and output bounding boxes around faces in an image. In case of several detected faces, the system can be configured to only select the ones that are within a predetermined distance of a suspected or detected weapon. The face recognition system can use a database of faces of suspects, such faces of suspects provided by relevant authorities. The system can use a face matching algorithm and can select individuals with faces matching to the one provided in the inputted image or images. If a probability of a match is above a predefined threshold the user of the application can receive a report with suspect identification as well as the image (cropped or not) and a probability of the match.

The violence detection system 102 is also shown including surveillance cameras (e.g., surveillance cameras 116a, 116b, and 116c), which can be video cameras. Each of the shown surveillance cameras can be configured to record video data and communicate the video data to the weapon detection circuitry 104 and optionally the violent behavior detection circuitry 106 via the LAN/WAN network(s) 118 and a communications interface of the violence detection system 102.

FIGS. 2-5 are flow diagrams of example methods that can be implemented by parts of the network of computer systems 100, in accordance with some embodiments of the present disclosure. The methods 200 and 300 and sub-methods for block 206 of method 200, in FIGS. 2-5, can each be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods and sub-methods can be performed by one or more aspects of the violence detection system 102. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 2:
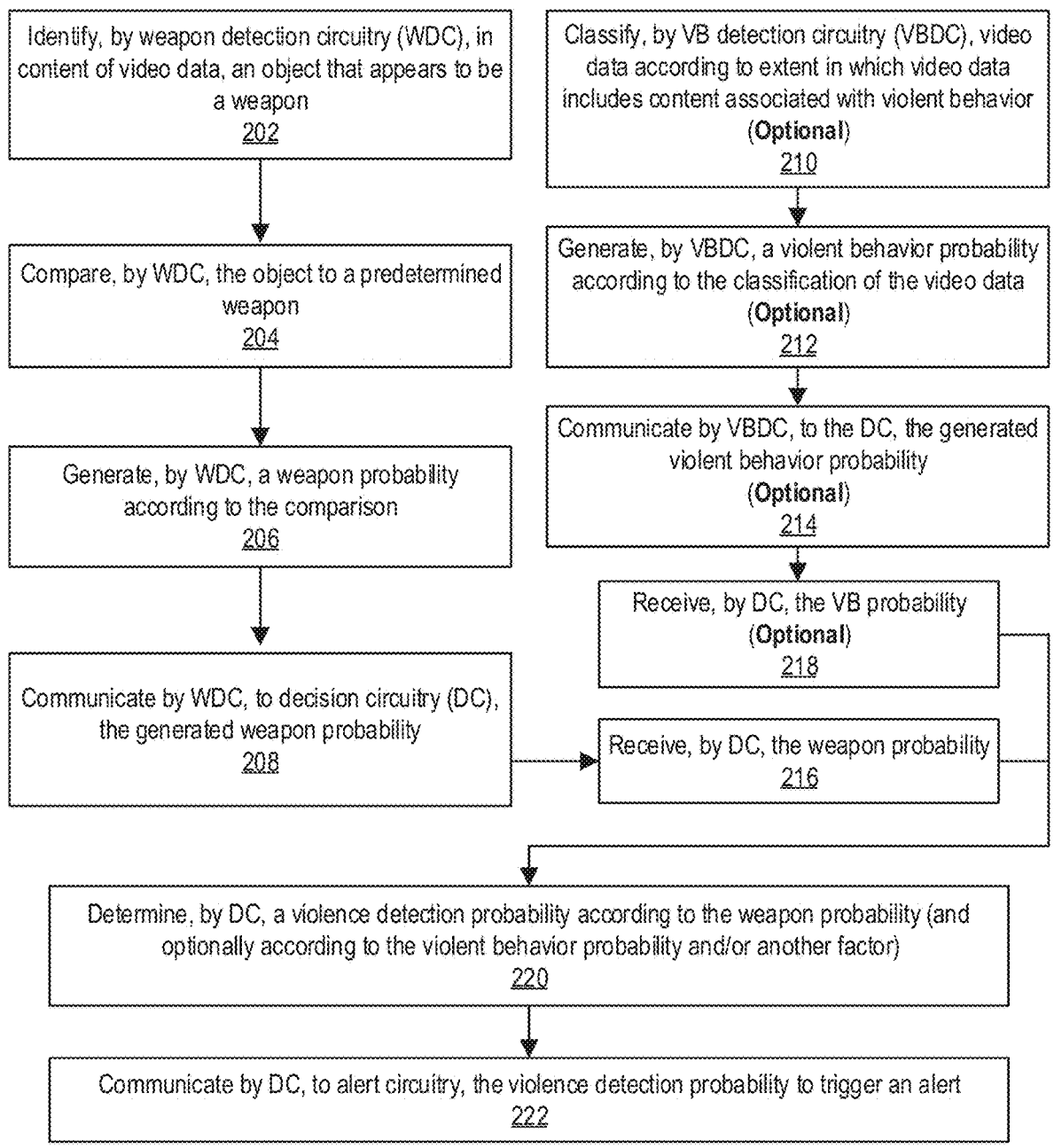
FIG. 2 is a flow diagram of an example method including the determination of a violence detection probability, in accordance with some embodiments of the present disclosure.

FIG. 2 is a flow diagram of an example method 200 including the determination of a violence detection probability, in accordance with some embodiments of the present disclosure. At block 202, the method 200 includes identifying, by weapon detection circuitry (e.g., weapon detection circuitry 104), in content of video data, an object that appears to be a weapon. At block 204, the method 200 continues with comparing, by weapon detection circuitry, the object to a predetermined weapon. It is to be understood that in some example embodiments, the comparison is not a direct comparison between the object and a predetermined weapon. For example, an ANN can be trained by data related to a predetermined weapon, such as a predetermined weapon stored in a database. Then, the object can be compared to the predetermined weapon by inputting data related to the object into the ANN. The ANN then outputs the weapon probability or some other value that is then used as a basis for the weapon probability.

At block 206, the method 200 continues with generating, by weapon detection circuitry, a weapon probability according to the comparison. At block 208, the method 200 continues with communicating by weapon detection circuitry, to decision circuitry (e.g., decision circuitry 110), the generated weapon probability.

At block 210, the method 200 can optionally continue with classifying, by violent behavior detection circuitry (e.g., violent behavior detection system 106), video data according to extent in which video data includes content associated with violent behavior. At block 212, the method 200 can optionally continue with generating, by the violent behavior detection circuitry, a violent behavior probability according to the classification of the video data. At block 214, the method 200 can optionally continue with communicating by the violent behavior detection circuitry, to the decision circuitry, the generated violent behavior probability.

At block 216, the method 200 continues with receiving, by the decision circuitry, the weapon probability. At block 218, the method 200 can optionally continue with receiving, by the decision circuitry, the violent behavior probability.

At block 220, the method 200 continues with determining, by the decision circuitry, a violence detection probability according to the weapon probability. Alternatively, the method 200 can continue with determining, by the decision circuitry, a violence detection probability according to the weapon probability and/or the violent behavior probability and/or another factor.

At block 222, the method 200 continues with communicating by the decision circuitry, to alert circuitry, the violence detection probability to trigger an alert.

Figure 3:
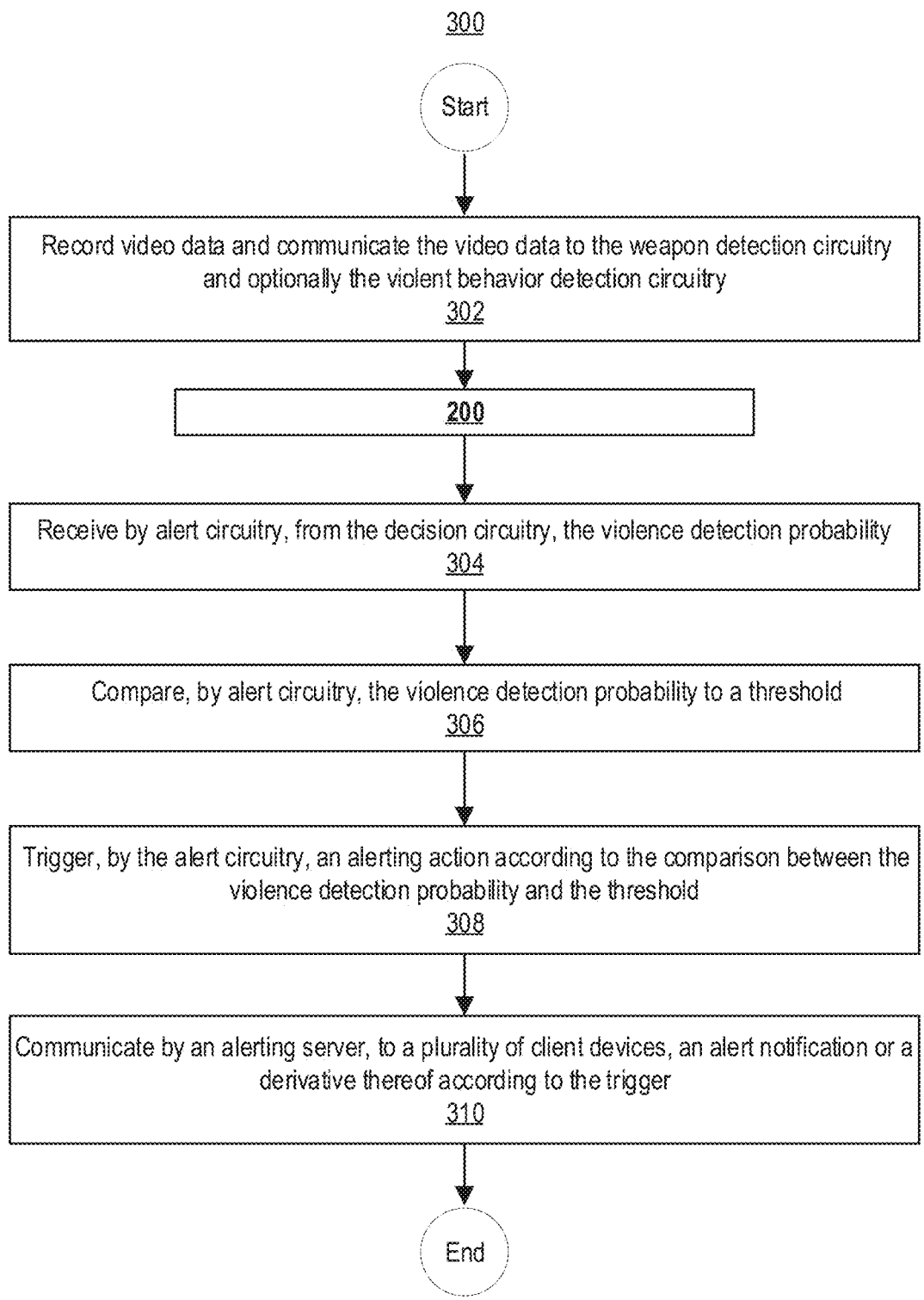
FIG. 3 is a flow diagram of another example method including the determination of a violence detection probability as well as using the determined violence detection probability to trigger and provide alerts, in accordance with some embodiments of the present disclosure.

FIG. 3 is a flow diagram of another example method 300 including the determination of a violence detection probability as well as using the determined violence detection probability to trigger and provide alerts, in accordance with some embodiments of the present disclosure. The method 300 includes the method 200 of FIG. 2, after block 302 and prior to block 304. At block 302, the method 300 includes recording, via surveillance cameras (e.g., see surveillance cameras 116a, 116b, and 116c), video data and communicating the video data to the weapon detection circuitry (e.g., weapon detection circuitry 104) and optionally the violent behavior detection circuitry (e.g., violent behavior detection circuitry 106) such that the method 300 can continue with method 200. In some embodiments, the cameras communicate the video data to the weapon detection circuitry and optionally the violent behavior detection circuitry over one or more networks (e.g., LAN/WAN network(s) 118).

In FIG. 3, after completing method 200, the method 300 can continue at block 304 with the method 300 including receiving, by alert circuitry (e.g., alert circuitry 111), from the decision circuitry (e.g., decision circuitry 110), the violence detection probability. At block 306, the method 300 continues with comparing, by alert circuitry, the violence detection probability to a threshold. At block 308, the method 300 continues with triggering, by the alert circuitry, an alerting action according to the comparison between the violence detection probability and the threshold. At block 310, the method 300 continues with communicating by an alerting server (e.g., alerting server 112), to a plurality of client devices (e.g., see client devices 114a, 114b, 114c), an alert notification or a derivative thereof according to the trigger.

FIG. 4 is a flow diagram of an example sub-method of block 206 for generation of the weapon probability, which can be a factor in the determination of the violence detection probability, in accordance with some embodiments of the present disclosure. At block 402, the sub-method includes repeatedly zooming in on the object that appears to be a weapon to generate a confidence level related to the level of confidence in the object actually being a weapon. At block 404, the sub-method includes generating the weapon probability according to the confidence level once the confidence level exceeds a confidence threshold at block 412. The block 404 occurs after the repeated zooming in and repeated determinations of the confidence level at block 412.

Block 402 (the repeated zooming in on the object to generate a confidence level) includes, at block 406, resizing an initial image in the video data, which includes the object that appears to be a weapon. Block 402 also includes, at block 408, cropping the edges off an area, in the resized image, having the object. Block 402 also includes, at block 410, resizing the cropped area such that cropped area becomes a new image. Block 402 also includes, at block 412, a determination as to whether the confidence level of the newest image from block 410 exceeds the confidence threshold.

If the confidence level of the newest image does not exceed the confidence threshold then the cropping of block 408 and resizing of block 410 is repeated along with a new determination of the confidence level for the newly resized image. If the confidence level of the newest image exceeds the confidence threshold, then the sub-method of block 206 (generation of the weapon probability) continues with block 404 (the generation of the weapon probability according to the confidence level).

Figure 5:
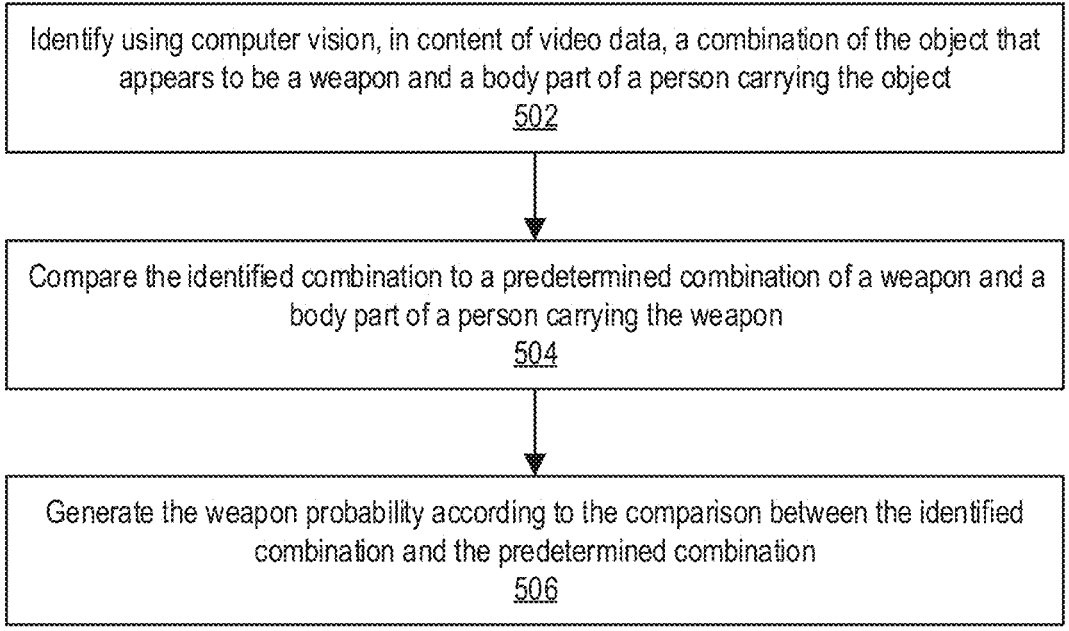
FIG. 5 is a flow diagram of another example method for generation of the weapon probability, which can be a factor in the determination of the violence detection probability, in accordance with some embodiments of the present disclosure.

FIG. 5 is a flow diagram of another example sub-method of block 206 for generation of the weapon probability, which can be a factor in the determination of the violence detection probability, in accordance with some embodiments of the present disclosure. At block 502, the sub-method includes identifying using computer vision, in content of video data, a combination of the object that appears to be a weapon and a body part of a person carrying the object. At block 504, the sub-method continues with comparing the identified combination to a predetermined combination of a weapon and a body part of a person carrying the weapon. At block 506, the sub-method continues with generating the weapon probability according to the comparison between the identified combination and the predetermined combination.

It is to be understood that in some example embodiments, the comparison is not a direct comparison between the identified combination and the predetermined combination. For example, an ANN can be trained by data related to a predetermined combination of a weapon and a body part of a person carrying the weapon, such as a predetermined combination of a weapon and a body part of a person carrying the weapon stored in a database. Then, the identified combination can be compared to the predetermined combination by inputting data related to the identified combination into the ANN. The ANN then outputs the weapon probability or some other value that is then used as a basis for the weapon probability.

Figure 6:
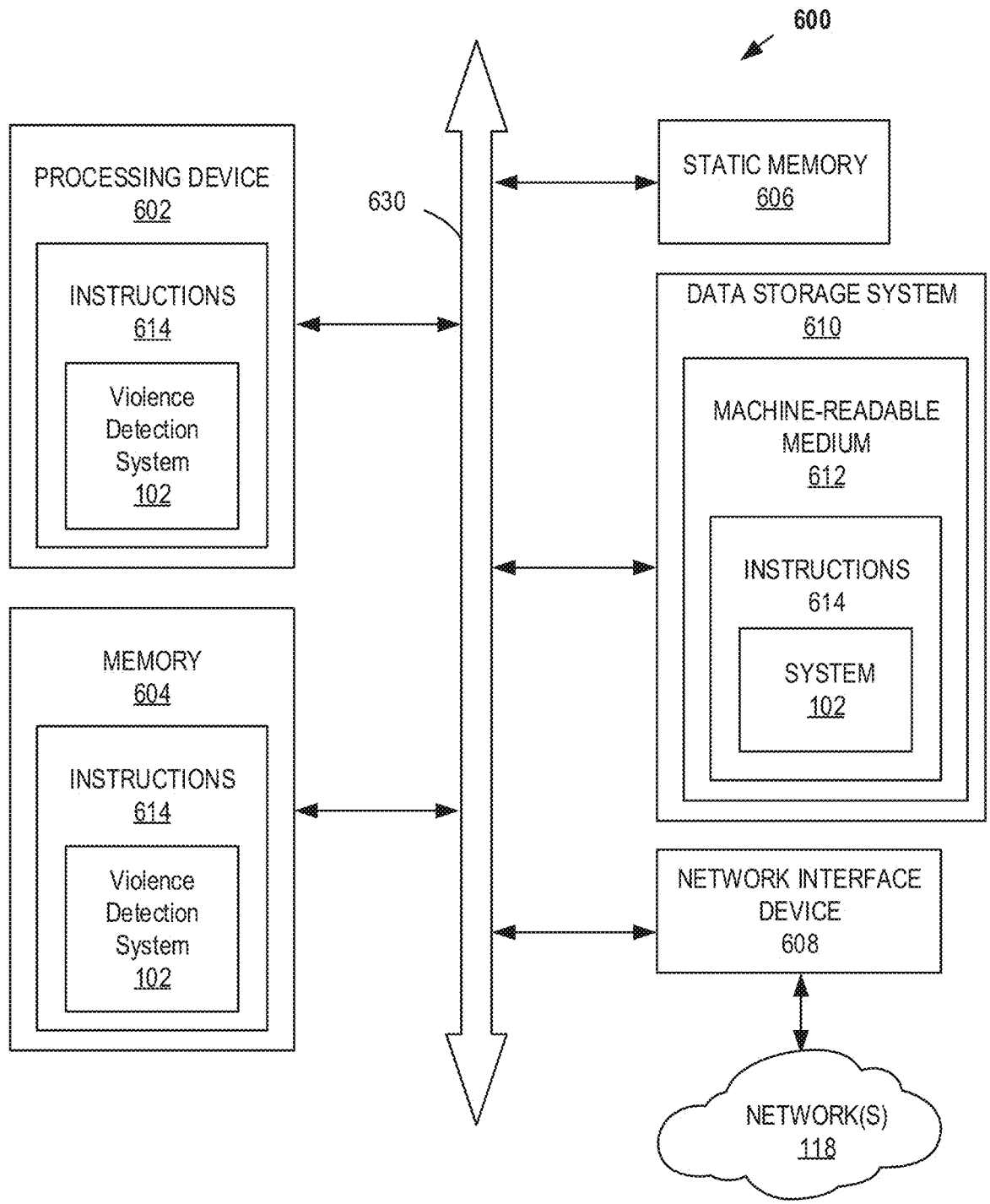
FIG. 6 is a block diagram of example aspects of an example computer system, in accordance with some embodiments of the present disclosure.

FIG. 6 is a block diagram of example aspects of an example computer system 600, in accordance with some embodiments of the present disclosure. FIG. 6 illustrates parts of the computer system 600 within which a set of instructions, for causing the machine to perform any one or more of the methodologies discussed herein, can be executed. In some embodiments, the computer system 600 can correspond to a host system that includes, is coupled to, or utilizes memory or can be used to perform the operations of a controller (e.g., to execute an operating system to perform operations corresponding to the violence detection system 102). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random-access memory (DRAM) such as synchronous DRAM (SDRAM) or Rambus DRAM (RDRAM), etc.), a static memory 606 (e.g., flash memory, static random-access memory (SRAM), etc.), and a data storage system 610, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 614 for performing the operations and steps discussed herein, such as operations associated with the violence detection system 102. The computer system 600 can further include a network interface device 608 to communicate over the LAN/WAN network(s) 118 of FIG. 1.

The data storage system 610 can include a machine-readable storage medium 612 (also known as a computer-readable medium) on which is stored one or more sets of instructions 614 or software embodying any one or more of the methodologies or functions described herein, such as operations associated with the violence detection system 102. The instructions 614 can also reside, completely or at least partially, within the main memory 604 and/or within the processing device 602 during execution thereof by the computer system 600, the main memory 604 and the processing device 602 also constituting machine-readable storage media.

In one embodiment, the instructions 614 include instructions to implement functionality corresponding to the violence detection system 102. While the machine-readable storage medium 612 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
weapon detection circuitry configured to:
identify, in contents of video data, an object that appears to be a weapon using a computer vision system;
compare the object to a predetermined weapon stored in a database by inputting data related to the object into an artificial neural network (ANN) that was trained by data related to the predetermined weapon;
generate a weapon probability according to the comparison by:
analyzing an image from a frame of images of the video data to determine a confidence level that the object is a weapon or not a weapon;
generating the weapon probability according to the confidence level upon the confidence level exceeding a confidence threshold; and
zooming in, based on the generated weapon probability, unto an area of the probable weapon in a subsequent image frame of the video data for further processing which includes:
resizing a first image, in the video data, that comprises the object that appears to be a weapon;
cropping the edges off an area comprising the object, in the resized first image; and
resizing the cropped area, such that the cropped area becomes a second image—where the total number of pixels constituting the first resized image is of the same quantity as the total number of pixels constituting the second resized image;
communicate, to decision circuitry, the generated weapon probability; and
the decision circuitry is configured to:
receive, from the weapon detection circuitry, an input comprising the generated weapon probability;
determine a violence detection probability according to the input from the weapon detection circuitry; and
communicate, to alert circuitry, the violence detection probability to trigger an alert.

2. The system of claim 1, further comprising the alert circuitry, configured to:
receive, from the decision circuitry, the violence detection probability; compare the violence detection probability to a threshold; and
trigger an alerting action according to the comparison between the violence detection probability and the threshold.

3. The system of claim 2, wherein the alert circuitry is configured to communicate an alert notification to an alerting server, which is a part of the alerting action, and wherein the system further comprises the alerting server which is configured to communicate, to a plurality of client devices, the alert notification or a derivative thereof.

4. The system of claim 1, further comprising a video camera configured to record video data and communicate the video data to the weapon detection circuitry.

5. The system of claim 1, wherein the area is defined by a bounding box.

6. The system of claim 1, wherein, with the generation of the weapon probability, the weapon detection circuitry is configured to:
identify using computer vision, in contents of the video data, a combination of the object that appears to be a weapon and a body part of a person carrying the object;
compare the identified combination to a predetermined combination of a weapon and a body part of a person carrying the weapon by inputting data related to the identified combination into an artificial neural network (ANN) that was trained by data related to the predetermined combination; and
generate the weapon probability according to the comparison between the identified combination and the predetermined combination.

7. The system of claim 1, wherein the decision circuitry is configured to determine the violence detection probability according to a machine learning process, and wherein the machine learning process is configured to use an artificial neural network (ANN) to output the violence detection probability.

8. A method, comprising:
identifying, in contents of video data, an object that appears to be a weapon using a computer vision system;
comparing the object to a predetermined weapon stored in a database by inputting data related to the object into an artificial neural network (ANN) that was trained by data related to the predetermined weapon;
generating a weapon probability according to the comparison by:
analyzing an image from a frame of images of the video data to determine a confidence level that the object is a weapon or not a weapon;
generating the weapon probability according to the confidence level upon the confidence level exceeding a confidence threshold; and
zooming in, based on the generated weapon probability, unto an area of the probable weapon in a subsequent image frame of the video data for further processing which includes:
resizing a first image, in the video data, that comprises the object that appears to be a weapon;
cropping the edges off an area comprising the object, in the resized first image; and
resizing the cropped area, such that the cropped area becomes a second image where the total number of pixels constituting the first resized image is of the same quantity as the total number of pixels constituting the second resized image;

determining a violence detection probability according to the generated weapon probability; and transmitting the violence detection probability to trigger an alert.

9. The method of claim 8, further comprising:

comparing the violence detection probability to a threshold; and triggering an alerting action according to the comparison between the violence detection probability and the threshold.

10. The method of claim 9, further comprising:

communicating an alert notification to an alerting server, which is a part of the alerting action; and communicating to a plurality of client devices, by the alerting server, the alert notification or a derivative thereof.

11. The method of claim 8, further comprising:

recording, by a video camera, the video data; and communicating the video data to weapon detection circuitry to generate the weapon probability.

12. The method of claim 8, wherein the cropping includes the area as defined by a bounding box.

13. The method of claim 8, wherein, with the generation of the weapon probability, the method further comprises:

identifying using computer vision, in contents of the video data, a combination of the object that appears to be a weapon and a body part of a person carrying the object;

comparing the identified combination to a predetermined combination of a weapon and a body part of a person carrying the weapon by inputting data related to the identified combination into an artificial neural network (ANN) that was trained by data related to the predetermined combination; and generating the weapon probability according to the comparison between the identified combination and the predetermined combination.

14. The method of claim 8, wherein the determining of the violence detection probability is according to a machine learning process, and wherein the machine learning process includes using an artificial neural network (ANN) to output the violence detection probability.

15. A non-transitory computer-readable storage medium tangibly encoded with computer executable instructions, that when executed by a processor associated with a computing device, performs a method, the method comprising:

identifying, in contents of video data, an object that appears to be a weapon using a computer vision system;

comparing the object to a predetermined weapon stored in a database by inputting data related to the object into an artificial neural network (ANN) that was trained by data related to the predetermined weapon;

generating a weapon probability according to the comparison:

analyzing an image from a frame of images of the video data to determine a confidence level that the object is a weapon or not a weapon;

generating the weapon probability according to the confidence level upon the confidence level exceeding a confidence threshold; and zooming in, based on the generated weapon probability, unto an area of the probable weapon in a subsequent image frame of the video data for further processing which includes:

resizing a first image, in the video data, that comprises the object that appears to be a weapon;

cropping the edges off an area comprising the object, in the resized first image; and resizing the cropped area, such that the cropped area becomes a second image where the total number of pixels constituting the first resized image is of the same quantity as the total number of pixels constituting the second resized image;

determining a violence detection probability according to the generated weapon probability;

and transmitting the violence detection probability to trigger an alert.

16. The non-transitory computer-readable storage medium of claim 15, wherein the executable instructions further perform the method of:

comparing the violence detection probability to a threshold; and triggering an alerting action according to the comparison between the violence detection probability and the threshold.

17. The non-transitory computer-readable storage medium of claim 15, wherein the executable instructions further perform the method of:

communicating an alert notification to an alerting server, which is a part of the alerting action; and communicating to a plurality of client devices, by the alerting server, the alert notification or a derivative thereof.

18. The non-transitory computer-readable storage medium of claim 16, wherein the executable instructions further perform the method of:

recording, by a video camera, the video data; and communicating the video data to weapon detection circuitry to generate the weapon probability.

19. The non-transitory computer-readable storage medium of claim 15, wherein the executable instructions performing cropping comprises cropping the area as defined by a bounding box.

20. The non-transitory computer-readable storage medium of claim 16, wherein the executable instructions performing generation of the weapon probability further comprise the method of:

identifying using computer vision, in contents of the video data, a combination of the object that appears to be a weapon and a body part of a person carrying the object;

comparing the identified combination to a predetermined combination of a weapon and a body part of a person carrying the weapon by inputting data related to the identified combination into an artificial neural network (ANN) that was trained by data related to the predetermined combination; and generating the weapon probability according to the comparison between the identified combination and the predetermined combination.

21. The non-transitory computer-readable storage medium of claim 16, wherein the executable instructions performing determining of the violence detection probability is according to a machine learning process, and wherein the machine learning process includes using an artificial neural network (ANN) to output the violence detection probability.

* * * * *